United States Patent
Paquien (10) Patent No.: US 10,156,281 B2
(45) Date of Patent: Dec. 18, 2018

(54) ASSEMBLY OF A CRANKSHAFT END PORTION WITH A FLYWHEEL AND A GUIDE BEARING, AND RELATED ENGINE ASSEMBLY

(71) Applicant: NTN-SNR Roulements, Annecy (FR)

(72) Inventor: Marc Paquien, Talloires Montmin (FR)

(73) Assignee: NTN-SNR Roulements, Annecy (FR)

( * ) Notice: Subject to any disclaimer, the term of this patent is extended or adjusted under 35 U.S.C. 154(b) by 0 days.

(21) Appl. No.: 15/746,546

(22) PCT Filed: Jul. 20, 2016

(86) PCT No.: PCT/FR2016/051879
§ 371 (c)(1),
(2) Date: Jan. 22, 2018

(87) PCT Pub. No.: WO2017/013359
PCT Pub. Date: Jan. 26, 2017

(65) Prior Publication Data
US 2018/0216699 A1    Aug. 2, 2018

(30) Foreign Application Priority Data

Jul. 21, 2015 (FR) ..................... 15 56894

(51) Int. Cl.
*F16F 15/31* (2006.01)
*F16F 15/315* (2006.01)
(Continued)

(52) U.S. Cl.
CPC ............ *F16F 15/3153* (2013.01); *F16C 9/02* (2013.01); *F16C 33/363* (2013.01);
(Continued)

(58) Field of Classification Search
CPC ..... F16F 15/3153; F16F 33/3156; F16C 9/02; F16C 2223/60
See application file for complete search history.

(56) References Cited

U.S. PATENT DOCUMENTS 3,819,243 A  *  6/1974  Asberg et al. ...... B60B 27/0005
                                                           384/542
4,013,298 A  *  3/1977  Bjerk ........................ F16O 9/02
                                                           277/431
(Continued)

FOREIGN PATENT DOCUMENTS

DE    10 2009 025151 A1    12/2010
FR       2 906 167 A1      3/2008
(Continued)

OTHER PUBLICATIONS

International Search Report and Written Opinion issued by the European Patent Office, acting as the International Searching Authority, for International Application PCT/FR2016/051879 dated Nov. 22, 2016.

*Primary Examiner* — Thomas R Hannon
(74) *Attorney, Agent, or Firm* — McCarter & English, LLP (57) ABSTRACT

To assemble an end portion (12) of a crankshaft (10) defining an axis (100) of revolution, forming at least one first bearing surface (30), turned radially outward, and a shoulder (32), on which threaded holes (34) lead outward, with a flywheel (24) comprising axial bores (36) and a bearing (28) for guiding the crankshaft relative to an engine housing (26) in rotation about the axis of revolution, attachment screws (16) passing through the axial bores of the flywheel and screwed into the threaded holes in the crankshaft end portion are provided, thus rigidly connecting the flywheel to the crankshaft end portion. The guide bearing comprises at least one unitary guide ring (42) positioned on the first bearing (Continued)

surface (30) and having a first transverse surface (44) axially bearing on the shoulder (32). The unitary guide ring comprises axial bores (48) which are aligned with the threaded holes (34) in the crankshaft and the axial bores of the flywheel (36) and have the screws (16) passing therethrough.

13 Claims, 6 Drawing Sheets

(51) Int. Cl.
    *F16C 9/02*         (2006.01)
    *F16C 33/36*       (2006.01)
    *F16C 35/067*     (2006.01)

(52) U.S. Cl.
    CPC ........ *F16C 35/067* (2013.01); *F16F 15/3156* (2013.01); *F16C 2226/60* (2013.01); *F16C 2360/22* (2013.01)

(56) References Cited

U.S. PATENT DOCUMENTS

| | | | |
|---|---|---|---|
| 4,668,116 A | 5/1987 | Ito | |
| 8,585,367 B2 * | 11/2013 | Bech | ........................ F16O 19/18 29/402.01 |

FOREIGN PATENT DOCUMENTS

| | | |
|---|---|---|
| GB | 2 168 784 A | 6/1986 |
| JP | 60-088244 A | 5/1985 |

* cited by examiner

ASSEMBLY OF A CRANKSHAFT END PORTION WITH A FLYWHEEL AND A GUIDE BEARING, AND RELATED ENGINE ASSEMBLY

CROSS-REFERENCE TO RELATED APPLICATIONS

This application is the National Stage entry under 35 U.S.C. § 371 of international Application Number PCT/FR2016/051879 filed on Jul. 20, 2016, published on Jan. 26, 2017 under publication number WO 2017/013359 A1, which claims the benefit of priority under 35 U.S.C. § 119 of French patent application number 1556894 filed Jul. 21, 2015.

TECHNICAL FIELD OF THE INVENTION

The invention relates to coaxial assembly between a flywheel and a crankshaft, integrating a guide bearing.

PRIOR ART

Figure 1:
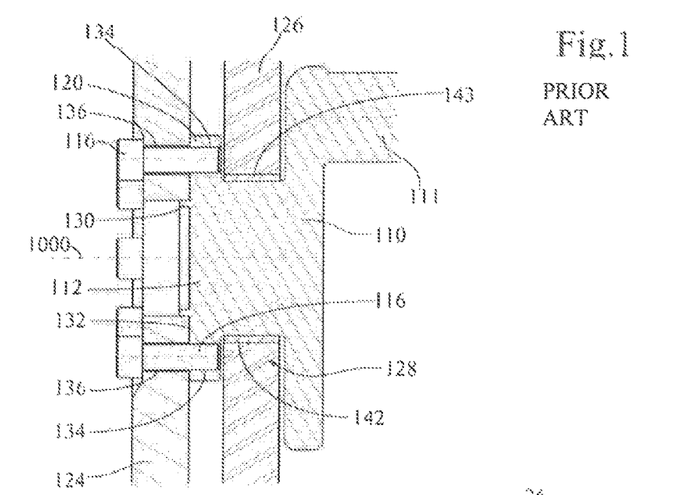
FIG. 1, an axial section of an assembly of a flywheel on a crankshaft according to the prior art, described previously.

According to the prior art illustrated in FIG. 1, a crankshaft 110 of an internal combustion engine has an end portion 112 guided for rotation about an axis of revolution 100 with respect to an engine casing 126 by means of a plain bearing 128, this end 112 comprising a collar 120 projecting outside the engine casing 126. The collar 120 forms a positioning surface 130 turned radially outwards and a shoulder 132 on which threaded holes 134 emerge, and thus constitutes a fixing interface for a flywheel 124, which is positioned on the positioning surface 130 in direct abutment against the shoulder 132. The flywheel 124 is provided with bores 136 aligned with the threaded holes 134, the flywheel 124 being fixed to the crankshaft 110 by fixing screws 116 passing through the bores 136 and screwed into the threaded holes 134. With an assembly of this type, the plain bearing 128 consists of a bearing shell 142 in at least two parts, positioned on a journal 143 of the crankshaft confined between the collar 120 and the first crank 111 of the crankshaft 110.

The recent development in internal combustion engines with low fuel consumption towards engine speeds with a low rotation speed and high engine torque, with intermittent functioning in stop/start mode, causing high tension on the accessory drive belt, and interruptions in the oil pump, greatly stresses the plain bearings, in particular on start-up and during transient periods when cold. It may thus be advantageous to replace some of the plain bearings of the crankshaft, in particular the bearing with a two-part shell at the end of the crankshaft carrying the flywheel, with rolling bearings, which are more efficient when cold. A problem of assembly is then encountered, because of the confinement of the journal between the collar and the first crank of the crankshaft, which requires either an inner bearing ring in two parts, a solution that is not very efficient, or a rolling path formed directly on the crankshaft, as suggested in the document FR 2 906 167. This solution is particularly expensive and does not make it possible to optimise the choice of material forming the rolling path. Another solution would consist of eliminating the collar, but with the drawback of considerably reducing the surface area available for fixing the flywheel to the crankshaft, and therefore reducing the number of fixing screws, but also of reducing the screw fixing diameter and therefore, for a given nominal torque, increasing the shear forces undergone by each screw.

The confinement of the journal 143 between the collar 120 and the first crank 111 of the crankshaft 110 also poses a problem if it is wished to increase the performance of the plain bearing 128 by replacing the two-part shell 142 with a single-piece annular shell.

DISCLOSURE OF THE INVENTION

The invention aims to remedy the drawbacks of the prior art and to propose an assembly between a crankshaft and a flywheel that affords more efficient rotational guidance, in particular when cold. To do this, according to a first aspect of the invention, an assembly is proposed comprising a crankshaft end portion defining an axis of revolution forming at least one first bearing surface turned radially outward, and a shoulder on which threaded holes emerge, a flywheel comprising axial bores, a bearing for guiding the crankshaft with respect to an engine casing, in rotation about the axis of revolution, and fixing screws. The guide bearing comprises at least one single-piece guide ring positioned on the first bearing surface and having a first transverse face in axial abutment on the shoulder, the single-piece guide ring comprising axial bores aligned with the threaded holes in the crankshaft and the axial bores in the flywheel. The flywheel is fixed to the end portion of the crankshaft by the fixing screws, which pass through the axial bores in the flywheel and single-piece guide ring and come to be screwed in the threaded holes in the shoulder of the end portion of the crankshaft.

The assembly thus defined, by eliminating the collar of the prior art, allows mounting of a single-piece guide ring, which may be a single-piece annular shell of a plain bearing, an inner ring or a mixed ring. By disposing the axial bores on the ring, the elimination of the collar does not take place to the detriment of the surface area available for the position of the fixing screws. It is thus possible to provide fixing screws in a sufficient number to limit the shear forces on each screw. Finally, elimination of the collar reduces the axial size of the assembly.

Preferably, the flywheel is in direct or indirect axial abutment against a second transverse face of the single-piece guide ring opposite to the first transverse face. The ring constitutes a strut gripped between the shoulder of the end portion of the crankshaft and the flywheel.

Preferably, the single-piece guide ring is shrunk on the first bearing surface of the end portion of the crankshaft and has a surface turned radially inwards, complementary to the surface of the first bearing surface. The first bearing surface of the end portion of the crankshaft is preferably cylindrical.

According to one embodiment, the flywheel is slid onto the end of the crankshaft, and comprises a central bore having a surface turned radially inwards, complementary to the surface of the bearing surface of the crankshaft, the direct or indirect axial abutment against the second transverse face of the single-piece guide ring opposite to the first transverse face still being able to be produced as previously described.

According to one embodiment, the bearing comprises at least one plain-bearing element. The single-piece guide ring then comprises a sliding track turned radially outwards.

According to another embodiment, the bearing comprises at least one rolling-bearing element. The single-piece guide ring may then be an internal ring on which at least one rolling path is formed, turned radially outwards. The guide bearing may in this case also further comprise at least one outer ring on which at least one rolling path is formed, turned radially inwards, and rolling bodies moving on the rolling paths of the inner and outer rings. The outer ring of the guide bearing is preferably mounted with a tight fit, for example by shrinking on, in a bearing surface of the casing, turned radially inwards.

Remarkably, the guide bearing may comprise a rolling-bearing element contiguous with a plain-bearing element or with a second rolling-bearing element for example, the two bearing elements being able to be implemented on a common inner guide ring or on a plurality of inner rings.

According to another aspect of the invention, this relates to an engine assembly comprising an engine casing and an assembly as previously described. Preferably, the guide ring has a transverse face that projects out of the engine casing, to enable the flywheel to come into direct or indirect axial abutment against the single-piece guide ring. In the case of an assembly comprising a rolling bearing, the outer ring of the guide bearing is preferably shrunk in a bearing surface of the casing turned radially inwards.

BRIEF DESCRIPTION OF THE FIGURES

Other features and advantages of the invention will emerge from a reading of the following description with reference to the accompanying figures, which illustrate.

For more clarity, the identical or similar elements are marked by identical reference signs on all the figures.

DETAILED DESCRIPTION OF EMBODIMENTS

Figure 2:
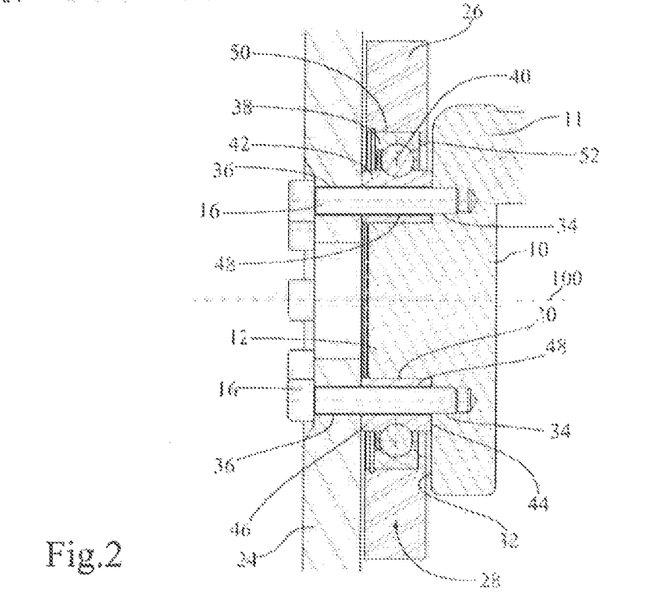
FIG. 2, an axial section of an assembly according to a first embodiment of the invention.

In FIG. 2 an assembly according to a first embodiment of the invention is illustrated, comprising a crankshaft 10 guided for rotation in an engine casing 26 by means of a guide bearing 28, to which a flywheel 24 is fixed by fixing screws 16.

The crankshaft 10 comprises cranks 11 and an end portion 12, which forms a first bearing surface 30, here cylindrical, turned radially outwards, and a shoulder 32 on which threaded axial holes 34 emerge. The flywheel 24 comprises a plurality of axial bores 36 aligned with the threaded axial holes 34 in the end portion 12 of the crankshaft. The guide bearing 28 provides the rotational guidance of the crankshaft and of the flywheel 24 about an axis of revolution 100 and is composed of an outer bearing ring 38 mounted with a tight fit in an opening 50 in the engine casing 26, in abutment against a shoulder 52 of the opening, rolling bodies 40 and an inner bearing ring 42. The inner bearing ring 42 has two transverse abutment faces 44 and 46 and is also pierced with a plurality of axial bores 48, aligned with the threaded holes 34 in the end portion of the crankshaft.

The mounting of the various elements of the assembly can be done in the following manner. The rolling bearing 28 is preassembled, and its inner ring 42 is shrunk onto the first bearing surface 30 of the end portion 12, the transverse face 44 of the inner ring coming into abutment on the shoulder 32 of the crankshaft. The subassembly consisting of the crankshaft 10 and rolling bearing 28 is inserted inside the engine casing 26 in two parts, positioning the outer ring 38 in abutment against the shoulder 42 of the casing. The engine casing 26 is next closed and the flywheel 24 is fixed to the subassembly consisting of the crankshaft 10 and rolling bearing 28 by fixing screws 16 screwed into the threaded holes 34 of the crankshaft through the bores 36 of the flywheel 24 and of the inner ring 42 of the rolling bearing until abutment is achieved of the flywheel 24 on the transverse face 46 of the inner ring 42 of the rolling bearing, which projects outside the engine casing 26. In the assembled state, a clearance remains between the flywheel 24 and the engine casing 26.

Figure 3A:
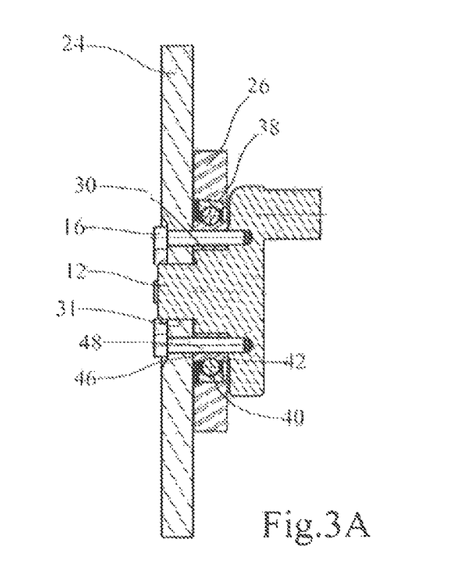
FIGS. 3A and 3B, axial and cross sections of an assembly according to a second embodiment of the invention.
Figure 3B:
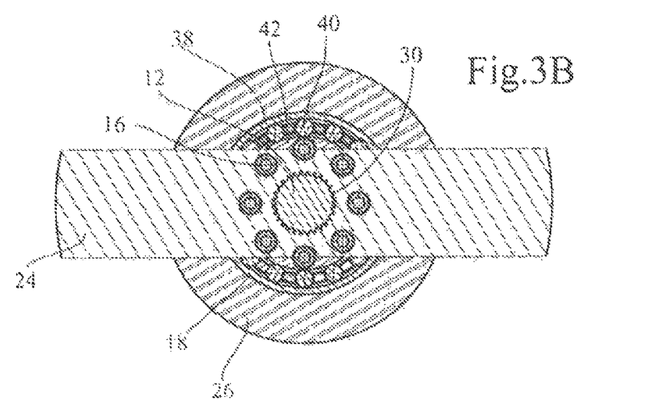

According to a second embodiment illustrated in FIGS. 3A and 3B, the end portion 12 of the crankshaft is substantially longer and the flywheel is slid onto a second bearing surface 31 through a central bore, the inwardly turned radial surface of which is complementary to the surface of the second, cylindrical, bearing surface 31, fluted or other. As before, the flywheel comes into abutment on the transverse face 46 of the inner ring of the rolling bearing for secure fixing with the crankshaft.

Figure 4A:
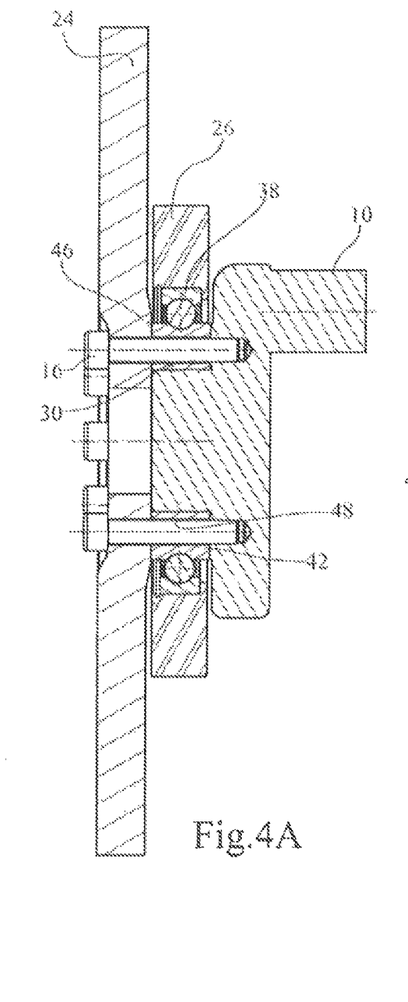
FIG. 4A an axial section of an assembly according to a third embodiment of the invention.
Figure 4B:
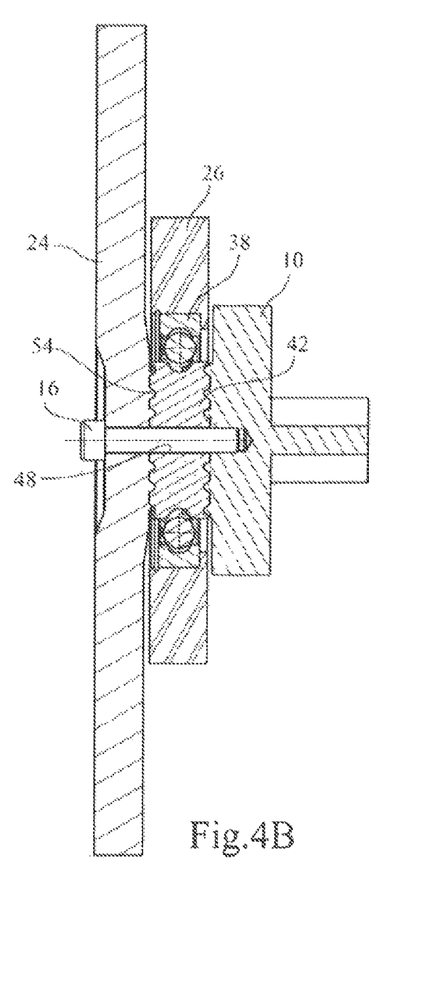
FIG. 4B a cross section of the assembly in FIG. 4A in a plane parallel to the plane of FIG. 4A, but offset therefrom.
Figure 4C:
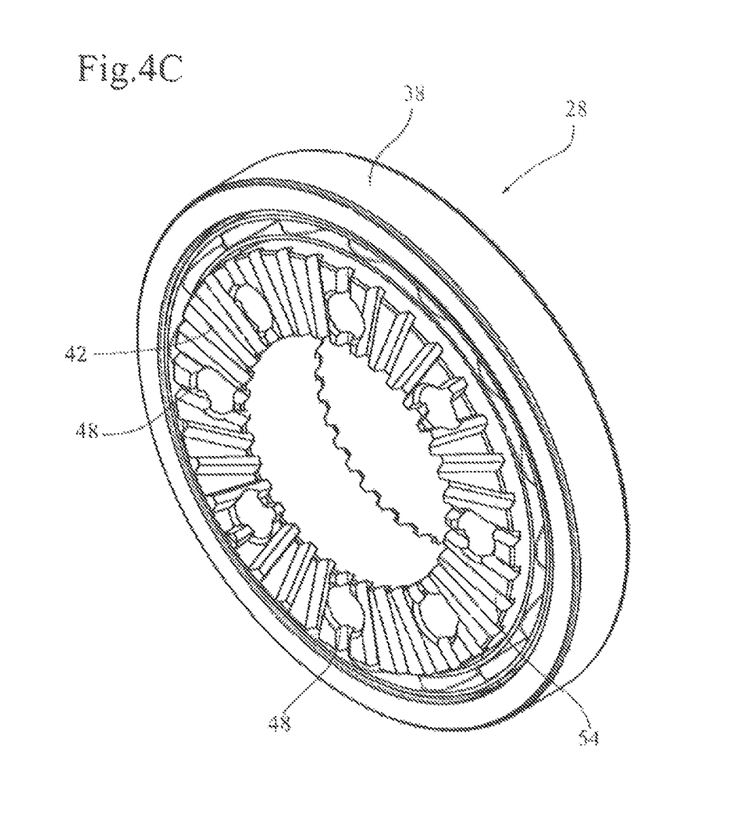
FIG. 4C an isometric view of a rolling bearing of the assembly of FIG. 4A.

According to a third embodiment illustrated in FIGS. 4A, 4B and 4C, the transverse face 46 of the inner ring 42 is provided with reliefs, which may for example be radial grooves 54 distributed over the entire circumference or over one or more angular sectors, and in which conjugate reliefs are inserted, for example corresponding radial ribs formed on the flywheel 24.

Figure 5:
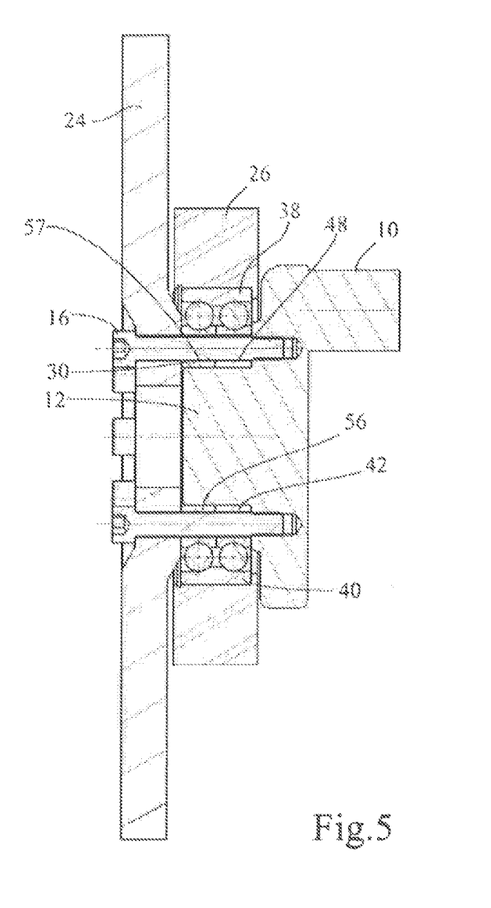
FIG. 5 an axial section of an assembly according to a fourth embodiment of the invention.

According to a fourth embodiment illustrated in FIG. 5, the rolling bearing 28 comprises two inner rings 42, 56, both shrunk onto the first cylindrical bearing surface 30 and pierced with bores 48, 57 to allow the fixing screws 16 to pass.

Figure 6:
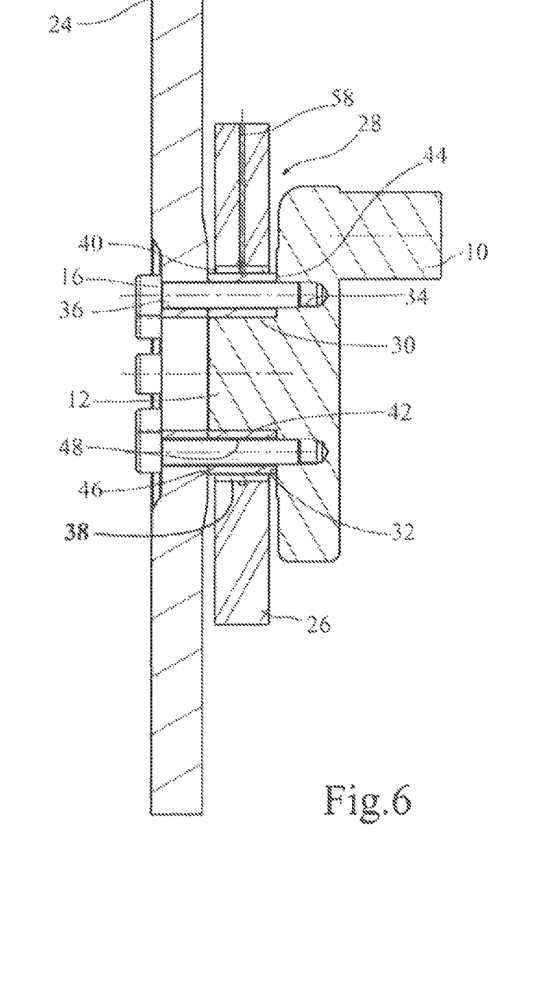
FIG. 6 an axial section of an assembly according to a fifth embodiment of the invention.

According to a fifth embodiment illustrated in FIG. 6, the bearing 28 is a plain bearing, comprising a single-piece sliding ring 42 shrunk onto the first bearing surface 30 of the end portion of the crankshaft and an outer sliding ring 38 secured to the casing 26 directly interposed between the crankshaft and the engine casing 26. The sliding ring 42 has a first transverse face 44 in axial abutment on the shoulder 32, and a second transverse face 42 projecting outside the casing 26 and in abutment against the flywheel 24, and axial bores 48 aligned with the threaded holes 34 in the crankshaft 10 and the axial bores 36 in the flywheel 24 and with the screws 16 passing through them. A duct 58 supplies oil to the interface between the fixed sliding ring 48 and the rotating sliding ring 42 so as to form therein a film of oil.

In variants that are not shown here, the guide bearing may combine plain bearings and rolling bearings, which in addition allows functioning at a high rotation speed.

Naturally the examples shown in the figures and discussed above are given only by way of illustration and non-limitatively. The bearing surfaces 30, 31 may have various profiles, cylindrical, frustoconical, fluted, oblong, elliptical, with a key groove facing a groove produced on the crankshaft, or other, for increasing the transmission of the torque and limiting the shearing of the fixing screws 16.

Provision is explicitly made for it to be possible to combine together the various embodiments illustrated in order to propose others.

The invention claimed is:

1. Assembly comprising:
   an end portion of a crankshaft having an axis of revolution, the end portion forming at least one first bearing surface turned radially outwards and a shoulder on which threaded holes emerge;
   a flywheel comprising axial bores;
   fixing screws passing through the axial bores in the flywheel and screwed into the threaded holes in the end portion of the crankshaft, making the flywheel integral with the end portion of the crankshaft; and
   a bearing for guiding the crankshaft with respect to an engine casing in rotation about the axis of revolution;
   wherein the guide bearing comprises at least one single-piece guide ring positioned on the first bearing surface and having a first transverse face in axial abutment on the shoulder, the single-piece guide ring comprising axial bores aligned with the threaded holes in the crankshaft and the axial bores in the flywheel and having the screws pass therethrough.

2. The assembly according to claim 1, wherein the single-piece guide ring is shrunk onto the first bearing surface and has a surface turned radially inwards, complementary to the first bearing surface.

3. The assembly according to claim 1, wherein the first bearing surface is cylindrical.

4. The assembly according to claim 1, wherein the single-piece guide ring comprises a sliding track turned radially outwards.

5. The assembly according to claim 1, wherein the flywheel is slid onto a second bearing surface formed on the end portion of the crankshaft, the flywheel comprising a central bore having a surface turned radially inwards complementary to the surface of the second bearing surface of the crankshaft.

6. The assembly according to claim 5, wherein the second bearing surface of the end portion of the crankshaft is fluted.

7. The assembly according to claim 1, wherein the single-piece guide ring is an inner roller bearing ring on which at least one rolling path is formed turned radially outwards.

8. The assembly according to claim 7, wherein the guide bearing further comprises at least one outer roller bearing ring on which at least one rolling path is formed, turned radially inwards, and rolling bodies moving on the rolling paths of the inner and outer roller bearing rings.

9. Engine assembly comprising an engine casing wherein it comprises an assembly according to claim 8, the outer ring of the guide bearing being mounted in a tight fit in a bearing surface of the engine casing turned radially inwards.

10. The engine assembly according to claim 9, wherein the flywheel is in direct or indirect axial abutment against a second transverse face of the single-piece guide ring opposite to the first transverse face and the guide ring projects out of the engine casing.

11. The assembly according to claim 1, that wherein the flywheel is in direct or indirect axial abutment against a second transverse face of the single-piece guide ring opposite to the first transverse face.

12. Engine assembly comprising an engine casing wherein it comprises an assembly according to claim 11 and the guide ring projects out of the engine casing.

13. Engine assembly comprising an engine casing, wherein it comprises an assembly according to claim 1.

* * * * *